Patented July 13, 1943

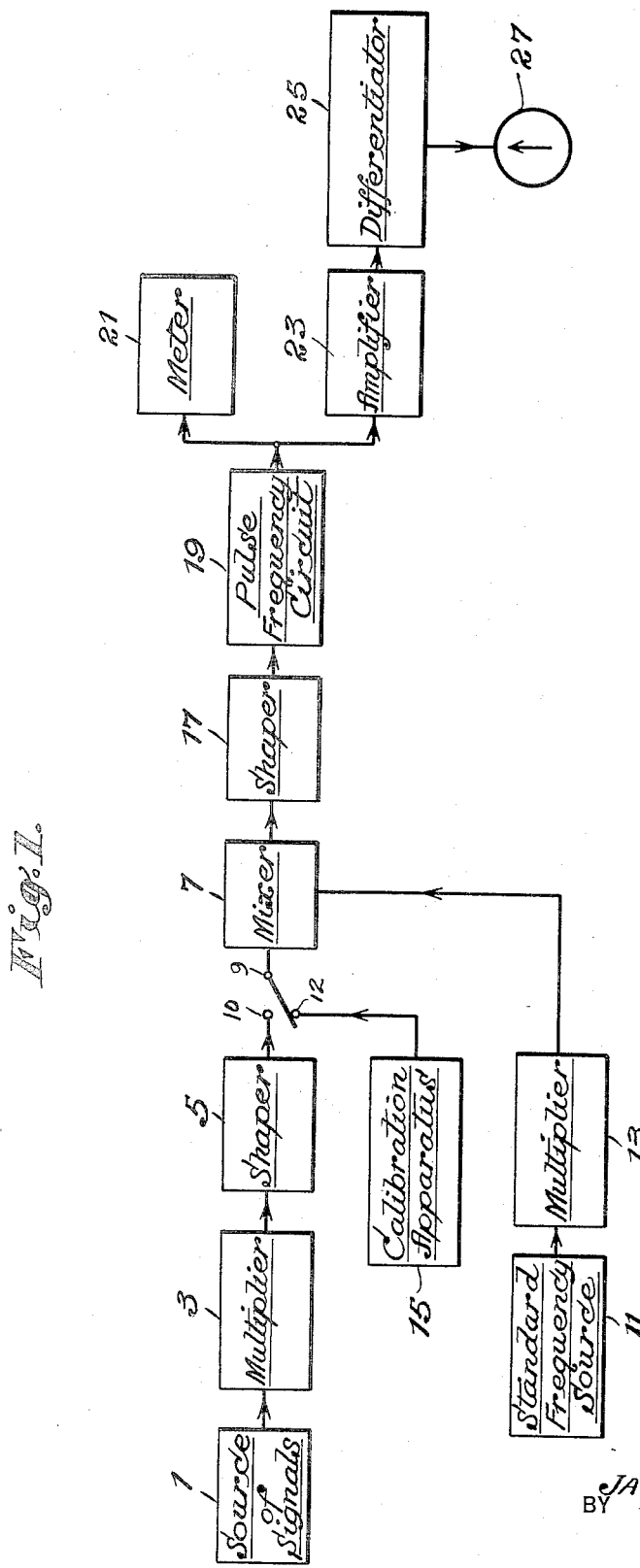

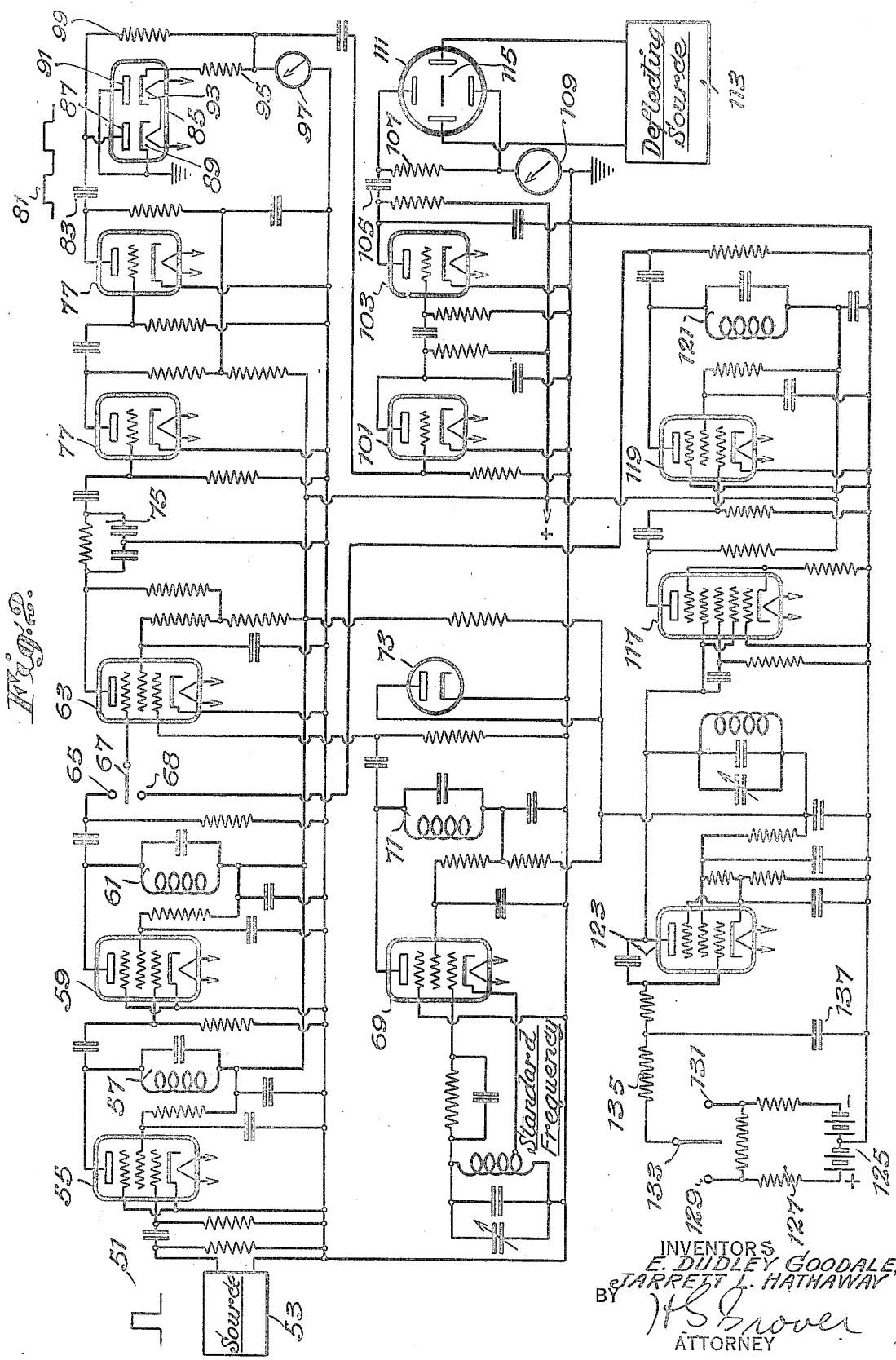

2,324,077

UNITED STATES PATENT OFFICE 2,324,077

MEASURING CIRCUIT

E. Dudley Goodale, Bayside, Long Island, N. Y., and Jarrett L. Hathaway, Cambridge, Mass., assignors to Radio Corporation of America, a corporation of Delaware Application December 27, 1941, Serial No. 424,602

10 Claims. (Cl. 172—245)

This invention relates to electrical circuits, and, in particular, to methods and means of measuring rates of changes of frequency electrically.

It is often necessary to know the rate of change of frequency of periodic sources, such as oscillators in the communication field or for industrial control equipment where the frequency is a parameter of the control process. Conventional methods of measuring the absolute frequency of a given interval of time and noting the change in absolute frequency at the beginning and at the end of the interval is only applicable where the time interval is relatively large. When the time interval over which the rate of change of frequency is to be measured becomes very short, conventional methods can no longer be utilized. For example, in television, it is necessary that the synchronizing generator which controls the speed and performance of receiving equipment be maintained, within very close limits, in synchronism with the power line frequency at the transmitting end. At the same time, it is also desirable that the rate of change of frequency, which the synchronizing generator undergoes in maintaining its synchronism with the power line frequency, be held to a relatively low value in order that mechanical types of television receivers can be properly synchronized.

Under ordinary circumstances, where all-electronic television receivers are used, large rates of changes of synchronizing frequency are of secondary importance, since the all-electronic systems have negligible inertia and can follow the rates of changes of frequency set up at the transmitter end. On the other hand, mechanical scanners used at the receiver have such large inertia that they are incapable of maintaining synchronism when the rate of change of frequency exceeds a relatively low value. For this reason, for example, in television, it is common to specify that change of frequency shall not exceed 20 cycles per second in a time interval of approximately 6 milliseconds, since it has been found that mechanical type of scanners can be maintained in synchronism under such conditions. Such a requirement in turn necessitates some method for ascertaining what the rate of change of frequency of the synchronizing generator is in order that the equipment shall be made to conform with the prescribed standards.

By our invention we provide both a method and apparatus in which the rates of change in frequencies can be accurately and readily measured without undue complexity of equipment. Briefly, in accordance with our invention, we first measure the difference in frequency between that of the source whose rate of change of frequency is to be measured and a standard source of frequency electrically. We thereafter electrically differentiate the instantaneous difference in frequency. The resultant derivative is in the form of a potential proportional to the rate of change of frequency. Measurement of the potential results, therefore, in the required parameter, since the time derivative of a change in frequency is the rate of change of frequency.

Where the frequency of the periodic phenomena whose rate of change of frequency is to be measured is of relatively low frequency, we first multiply the frequency to a relatively high value in order to facilitate the making of the measurements and to enhance the accuracy of the measurement. If it happens that the wave shape of the periodic phenomena is not sinusoidal, then we convert the wave shape of the periodic phenomena to that of a sinusoidal wave in order to further facilitate the making of the measurement and to insure a result having a required precision.

Further, to provide a continuous visual representation of the rate of change, a derived voltage proportional to the rate of change of frequency may be applied to a cathode ray oscillograph having a calibrated indicia thereon, or, alternatively, a current proportional to the rate of change of frequency may be supplied to an electric meter whose scale is directly calibrated in units of rate of change of frequency. Accordingly, it will be appreciated that the main object of our invention is to provide a new method and apparatus for measuring the rate of change of frequency.

A further object of our invention is to provide method and apparatus for measuring rates of change of frequencies over relatively short time intervals.

Another object of our invention is to provide method and apparatus for giving a continuous visual indication and measurement of rates of change of frequencies of signal sources.

Still another object of our invention is to provide a method and apparatus for measuring the rates of change in frequency of periodic pulses.

Another object of our invention is to provide a system for measuring the rates of change of frequency, which system also includes means for calibrating the measuring system before and after measurement.

Yet another object of our invention is to provide a calibration system for rates of change of frequency measuring equipment in which the calibration system causes a definite rate of change of frequency.

Other objects of our invention will become apparent to those skilled in the art upon reading the following detailed explanation, in which reference will be made to the drawings.

In the drawings, there is shown in Figure 1 a block diagram indicating generally the units and steps used in our method and apparatus for measuring rates of change of frequencies, while Figure 2 shows in more detail a schematic circuit diagram embodying apparatus of our invention which utilizes our new method of measuring rates of change of frequency and means for calibrating the measuring system.

Referring now to Figure 1, the source of signals whose rate of frequency deviation is to be measured 1 is fed to a multiplier 3 to multiply its frequency to a relatively high value in the event that frequency of the signals from the source 1 is low. The output of the multiplier is fed to a wave shaper 5 to insure that the signals whose frequency has been multiplied possess a sinusoidal wave shape. This enables the apparatus to work with signals which may be any wave shape so long as the wave shape is periodically repeated. The output of the wave shaper 5 is then fed to the mixer 7 which is also fed by signals from a standard frequency source 11, which may include in its path a multiplier 13, in the event that the frequency of the standard signals is of low frequency. The multiplied standard frequency is so chosen to have a frequency of the same order as that of the signals to be measured. In some apparatus it may be desirable to have the multiplied standard frequency very close, i. e., within one or two cycles, to the multiplied signals whose frequency deviations are to be measured. In other apparatus the multiplied standard frequency is chosen so that there is a difference of a thousand cycles or so between the two multiplied frequencies. Thus, the output of the mixer 7 will provide, in the first case, a substantially zero beat output, and, in the second case, a beat frequency of a thousand cycles. It is desirable for the multiplied standard frequency to be lower than the multiplied frequency of the unknown, so that increasing deviations will give an increasing difference in beat frequency. The output of the mixer, which gives the difference of the two frequencies, is fed to a shaper 17 which converts the sinusoidal output into square top waves having substantially perpendicular sides, and whose marking interval is approximately equal to the spacing interval. The square waves from the shaper 17 are then fed to the pulse frequency circuit 19, which serves to produce a direct current output which is proportional to the number of pulses per second fed to the pulse frequency circuit 19. This direct current, therefore, will be proportional to the frequency of the output of the mixer and, consequently, is a measure of the difference in frequency between the source of signals 1 and the standard frequency 11 after they have both been multiplied. From a knowledge of the multiplication factors of the multipliers 3 and 13, the standard frequency 11 and the current flowing in 19, as measured by the meter 21, the frequency of the source of signals can be derived from the formula $$f_x = \frac{m_s f_s + \Delta f}{m_x}$$

where $f_x$ is the frequency of the source of signals 1, $f_s$ is the standard frequency, $m_x$ is the multiplier factor of the multiplier 3 and $m_s$ is the multiplier factor of the multiplier 13, and $\Delta f$ is the difference between the two frequencies measured on the meter, and equal to $\Delta f = kR$, where $k$ is a calibration constant and R is the reading of the meter 21. It will be appreciated that the two variables will be the unknown frequency $f_x$ and the frequency deviation $\Delta f$ so that the meter reading 21 actually is an indication of the frequency of the source of signals 1.

The output of the pulse frequency circuit 19 therefore is amplified, if necessary, by the amplifier 23 and fed to the differentiating unit 25, the output of which is fed to an indicator 27. Since the output of the unit 19 indicates the difference in frequency between that of the standard and the source of signals 1, the fluctuations in the value of D. C. current, when differentiated with respect to time, will represent the changes in frequency per unit of time, that is to say, the indicator 27 will give an indication which is proportional to the rate of change of frequency with respect to time. In other words, since the output of the unit 19 is equal to the $\Delta f$, the derivative with respect to time will be equal to $$\frac{\Delta f}{\Delta t}$$

and as the time interval grows smaller and smaller, approaches $$\frac{df}{dt}$$

which will be immediately recognized as the rate of change of frequency in units of cycles per second per second.

For purposes of giving a visual indication of the output of the differentiator 25 a suitably calibrated ammeter may be used, or, alternatively, the output may be fed to a deflecting system of a cathode ray tube with the other portion of the deflecting system being actuated by a suitable sweep voltage. Under these conditions the cathode ray tube will show a straight line when the source 1 is disconnected from the system. When the source 1 is connected to the system, then the straight line will be displaced, parallelly from its position of rest, an amount proportional to the rate of change of frequency. By positioning suitable indicia in register with the cathode ray tube, the displacements may be directly read in terms of cycles per second per second.

For purposes of calibration a switch 9 is provided to select the output from the shaper 5, or the output from the calibration apparatus 15. The calibration apparatus supplies to the mixer 7, when the switch 9 is connected to the contact 10, a frequency which changes a predetermined amount over a predetermined time interval. Consequently, by placing the switch so that the output of the calibration apparatus is fed to the mixer 7 and disconnecting the source of signals, there is provided a known rate of change of frequency to the mixer 7. For the supplied signal, therefore, the indicator 27 will show a deflection determined by the known rate of change of frequency and, consequently, the indicator 27 can be calibrated. The calibration apparatus will be described in detail in discussing Figure 2.

Turning now to Figure 2, and merely for purposes for illustration, it will be assumed that our new system is to be utilized for measuring the rate of change of frequency of line synchronizing impulses in a standard television system. As is well known, the line synchronizing impulses occur at a rate of 15,750 per second and possess a flat top with substantially vertical sides, as shown at 51.

The source of signals 53 supplies signals to the tube 55, which serves to multiply the frequency by a factor of 9, the tube 55 having zero bias on its control grid, and having a tuned circuit 57 to accentuate the 9th harmonic of the line frequency impulses.

The output of the tuned circuit is then fed to tube 59 which serves to amplify the 141.75 kc. signals resulting from the multiplication of line frequency impulses. The plate circuit of the tube 59 is likewise tuned to insure a substantially pure sinusoidal output therefrom. The output of the tuned circuit 61 in turn is fed to mixer tube 63 through contact 65 and switch 67. The mixer 63 is also fed with energy from an electron coupled oscillator multiplier tube 69. The tube 69 and its oscillatory circuits constitutes the standard frequency source, and the fundamental frequency is so chosen that the second harmonic of the fundamental frequency occurring in the anode circuit 71 of the tube 69 will differ, and in the example chosen, be less, by approximately a thousand cycles from that of the multiplied line frequency. In other words, the output of the tube 69 has a frequency of 140.75 kc. To insure reasonable stability, a regulatory tube 73 is provided to insure that the oscillator voltages will remain constant in spite of supply voltage fluctuations. The output from the tuned circuit 71 is fed to the mixer tube 63. Since its frequency differs from that of the frequency supplied from the tuned circuit 61 by a thousand cycles, the mixer tube will provide an output which will include the difference between these two frequencies, in addition to other frequency components.

Suitable filtering is provided by the circuit 75 so as to insure the passage of the beat frequency with its variations, and to attenuate the undesired frequencies. The output of the filter 75 is then coupled to a double triode tube 77, shown for convenience as two individual triodes, for the purpose of producing square-top waves from the sinusoidal output of the filter 75. This is brought about by overdriving the first half of the double triode 77 so that saturation takes place on positive cycle of the input. The output of the first half of the double triode 77 is then fed to the second half, which is in turn overdriven to provide saturation on the negative half-cycle of the supplied wave. There thus appears across the output resistor 79 square-top waves, as shown at 81.

The square-top waves 81 are fed through the condenser 83 to the double-diode 85. The positive half of the wave 81 passing through the condenser 83 will be rectified by the anode 87, but, since the path between the anode 87 and the cathode 89 contains no series impedance to ground, it will be clear that the positive half of the wave is short-circuited. The negative half of the wave will flow through the path comprising the resistor 99 and the meter 97. A variable resistor 95 is connected between the junction point of the resistor 99 and the meter 97 and the cathode 93 of the tube 85 in order to provide a balancing arrangement which will insure that the meter 97 will read in the zero position in the absence of a supplied wave 81. This is necessary because, as is well known, a diode sets up a contact potential due to space charge effects, even in the absence of a supplied signal. By utilizing the connection shown, however, it will be noted that the space charge current flowing through the two diode sections of the tube 85 flows in the opposite direction through the meter 97. Since the diode sections are substantially identical, the static current is also substantially identical and consequently, the currents cancel out each other in flowing through the meter so that the meter reads zero in the absence of a supplied signal.

Further, by use of the condenser 83 and the rectifier 85, the meter reading will be proportional to the frequency of the supplied impulses, as described in the Hathaway Patent 2,218,642, which issued October 22, 1940, for a "Frequency meter." The potential drop through the resistor 95 is accordingly substantially proportional to the frequency of the pulses fed to the tube 85. This potential is transferred to the amplifier tubes 101 and 103 for raising the level to a suitable value. The output of the tube 103 is fed through the differentiating circuit comprising the condenser 105 and the resistor 107. It will be readily appreciated that since the potential 95 is a slowly varying D. C. that only the changes in D. C. will be passed by the condenser 105 and, consequently, across the resistor 107 there will appear a potential which represents only the changes in the D. C. potential appearing across the resistor 95. Since the instantaneous value of the potential across the resistor 95 is proportional to the frequency, it follows that the potential appearing across the resistor 107 will represent the changes in frequency. The meter 109 in series with the resistor 107 will give a reading which is proportional to the rate of change of frequency and, consequently, can be calibrated directly in terms of rates of change of frequency. Alternatively, the potential across the resistor 107 may be fed to the deflecting plates of a cathode ray tube 111, while the other pair of plates are fed to a source of deflection 113, which, for example, may be a 60 cycle per second sweep. There will appear on the screen of the tube 111 a line 115 whose position is proportional to the rate of change of frequency.

For calibration purposes an oscillator 117 running at a frequency, for example, of 28.35 is multiplied in the frequency multiplier tube and circuit 119 to provide a frequency in the output circuit 121 of substantially 141.75 kilocycles, i. e., the same as the multiplied frequency of the source 53. Connected to the oscillator 117 is a reactance tube 123 which serves to control the exact frequency of the oscillator 117 in accordance with the bias potential supplied to the control grid of the tube 123. A battery 125 and potentiometer 127 provide a choice of bias on the tube 123 of, as an example, −.20 volt at 129, and −.22 volt at 131. The switch 133 selects either of these two voltages and feeds them through the resistance 135 and the capacity 137. Consequently, if the switch 133 is changed from the contact 129 to the contact 131, there will be a change of .02 volt supplied to the reactance tube 123, but this voltage will not be supplied as an instantaneous change, but rather at a rate which will be determined by the time constant of the resistor 135 and the capacity 137. Accordingly, the reactance tube will change the frequency of the oscillator 117, which can be read on the meter 97, a predetermined number of cycles, as determined by the change in voltage of the grid of the reactance tube, and at a known rate determined by the time constant of the resistor 135 and the capacity 137. Consequently, with the switch 67 thrown to the contact 68, a definite rate of change of frequency will be indicated at the meter 109 and at oscillograph 111. The known change in frequency and the known time interval over which it takes place provides calibration means for both the meter and the oscillograph.

It will be appreciated that it was only for purposes of illustration that the above frequencies were cited, and that other frequencies may be used, depending upon the specific application in which our invention is used. Moreover, it will be appreciated that while an electron coupled oscillator, for example, is shown at 69, other oscillators serving as a source of standard frequency may be used. It will be appreciated, further, that where the frequency whose rate of change is to be measured is only of a radio frequency that it is not necessary to multiply the frequency from the source. Again, if the source of signals to be measured provides a signal which is sinusoidal in shape, it will be appreciated it is unnecessary to use the shaping circuit shown at 55. Moreover, it will be appreciated that other forms of amplifiers may be used so long as they have the suitable characteristics of passing without attenuation the required signals.

Various alterations and modifications of the present invention may become apparent to those skilled in the art and it is desirable that any and all such modifications and alterations be considered within the purview of the present invention except as limited by the hereinafter appended claims.

We claim:

1. A measuring system comprising a source of periodic electrical impulses, means for deriving energy representative of said impulses, a source of standard frequency, means for comparing the frequency of said derived energy with said standard frequency, means for producing a direct current potential in accordance with the difference between the two said frequencies, means for differentiating said produced direct current potential with respect to time, and means for producing a visual indication in accordance with said differentiation.

2. A measuring system comprising a source of periodic electrical impulses, means for deriving energy representative of said impulses, a source of standard frequency, means for multiplying said standard frequency, means for comparing the frequency of said derived energy with said multiplied frequency, means for producing a direct current potential in accordance with the difference between the two said frequencies, means for differentiating said derived potential with respect to time, and means for producing a visual indication in accordance with said differentiation.

3. A measuring system comprising a source of periodic electrical impulses, a source of standard frequency, means for mixing said periodic electrical impulses with said standard frequency, means for producing a variable direct current potential in accordance with the difference between the frequencies of said periodic electrical impulses and said standard frequency, means for differentiating said produced potential with respect to time, and means for producing a visual indication in accordance with said differentiation.

4. A measuring system comprising a source of periodic electrical impulses, means for deriving energy representative of said impulses, a source of standard frequency, means for mixing said derived energy with said standard frequency, means for producing a variable direct current potential in accordance with the difference between the frequencies of said derived energy and said standard frequency, means for differentiating said produced variable direct current potential with respect to time, means for producing a visual indication in accordance with said differentiation, means to supply signals having a known rate of change of frequency, and selective means for substituting said signals for said derived representative energy to said mixing means.

5. The method of measuring rate of change of periodic electrical impulses which comprises deriving energy representative of the impulses whose rate of change of frequency is to be measured, comparing the frequency of the derived energy with energy having a predetermined standard frequency producing energy representative of the difference between the frequency of the derived energy and the frequency of the standard energy, and generating a variable direct current potential in accordance with the difference between the two frequencies from the produced energy.

6. The method of measuring rate of change of periodic electrical impulses which comprises deriving energy representative of the impulses whose rate of change of frequency is to be measured, comparing the derived energy with energy having a predetermined standard frequency, producing differential energy representative of the difference between the frequency of the derived energy and the frequency of the standard energy, and generating a variable direct current potential in accordance with the difference between the two frequencies from the produced differential energy.

7. The method of measuring rate of change of periodic electrical impulses which comprises deriving energy representative of the impulses whose rate of change of frequency is to be measured, heterodyning the frequency of the derived energy with energy having a predetermined standard frequency, producing energy representative of the difference between the frequency of the derived energy and the frequency of the standard energy, generating a variable direct current potential in accordance with the difference between the two frequencies from the produced energy, differentiating the generated variable direct current potential with respect to time, and producing a visual indication in accordance with the derivative resulting from the differentiation.

8. The method of measuring rate of change of periodic electrical impulses which comprises the steps of comparing the frequency of the periodic impulses with energy having the standard frequency, producing energy representative of the difference between the frequency of the periodic impulses and the frequency of the standard energy, generating a variable direct current potential in accordance with the difference between the two frequencies from the produced energy, and producing a visual indication representative of the generated variable direct current potential.

9. A measuring system comprising a source of variable frequency oscillations, a source of fixed frequency oscillations, means for comparing said variable frequency oscillations with said fixed frequency oscillations to produce a variable heat frequency oscillation, means for producing a direct current potential that varies in accordance with the produced variable beat frequency oscillation, means for differentiating said produced direct current potential with respect to time, and means for producing a visual indication in accordance with said differentiation.

10. The method of measuring the rate of change of frequency of a series of variable frequency electrical impulses which comprises the steps of mixing the variable frequency impulses with energy having a predetermined standard frequency, producing energy representative of the difference between the frequency of the variable frequency impulses and the frequency of the standard energy, generating a variable direct current potential in accordance with the difference between the two frequencies from the produced energy representative of the differential frequency, differentiating the generated variable potential with respect to time, and producing a visual indication in accordance with the derivative resulting from the differentiation.

E. DUDLEY GOODALE.
JARRETT L. HATHAWAY.